United States Patent
Anderson et al.

[11] 3,859,361
[45] Jan. 7, 1975

[54] FLUORINATED PEROXIDES

[75] Inventors: L. Ray Anderson, Morristown, N.J.;
William B. Fox, Alexandria, Va.;
Charles V. Hardin, Charlotte, N.C.;
Charles T. Ratcliffe, Denville, N.J.

[73] Assignee: Allied Chemical Corporation, New York, N.Y.

[22] Filed: Nov. 13, 1972

[21] Appl. No.: 306,072

[52] U.S. Cl. ............................ 260/610 R, 260/92.1
[51] Int. Cl. ............................................ C07c 73/00
[58] Field of Search ..................... 260/610 R, 610 A

[56] References Cited
UNITED STATES PATENTS

| | | | |
|---|---|---|---|
| 2,400,041 | 5/1946 | Dickey | 260/610 |
| 2,455,569 | 12/1948 | Dickey | 260/610 |
| 3,541,128 | 11/1970 | Talbott | 260/453 |

Primary Examiner—Bernard Helfin
Assistant Examiner—W. B. Lone
Attorney, Agent, or Firm—Roger H. Criss; Arthur J. Plantamura

[57] ABSTRACT

Novel peroxides having the formula

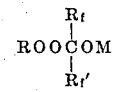

wherein R is an alkyl or phenylalkyl group, $R_f$ and $R_f'$ are fluoroperhaloalkyl groups, and M is hydrogen or an alkali metal, are prepared by reacting a peroxide of the formula ROOM with a ketone of the formula $R_f R_f' C{=}O$. The peroxides are useful as free radical initiators for the polymerization of olefins, especially fluoroolefins.

7 Claims, No Drawings

FLUORINATED PEROXIDES

This invention provides novel peroxides having the formula

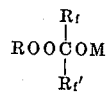

wherein R is selected from the group consisting of alkyl groups having one to eight carbon atoms and phenylalkyl groups having the formula

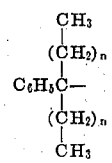

wherein each $n$ is independently 0 to 2; $R_f$ and $R_f'$ are independently fluoroperhaloalkyl groups having the formula $-CF_2(CFX)_nX$ wherein X is fluorine or chlorine and $n$ is 0 to 5; and M is hydrogen or an alkali metal.

The peroxides are prepared by reacting a fluoroperhaloketone having the formula $R_fR_f'C=O$ with a peroxide having the formula ROOM, as represented by the following equation

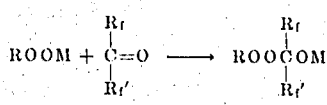

wherein R, $R_f$, $R_f'$ and M are as defined herein.

The reaction is conveniently carried out at room temperature. If desired, however, the reaction can be carried out at temperatures above or below room temperature, such as, for example, from about −20° to 50° C, preferably 0° C to 35° C.

The reaction is conveniently carried out under autogenous pressures, but the reaction pressure is not critical.

The reaction can be carried out in the absence of other materials, but it is desirable to carry out the reaction in the presence of an inert liquid diluent, preferably a diluent which is a solvent for the product. The product is soluble in polar organic solvents, such as acetonitrile.

The reactants may be added in any order and in any desired proportion. However, it is desirable either to use a slight excess of the fluoroperhaloketone or to add the fluoroperhaloketone to the reaction mixture until there is no evidence of further reaction. The product can be recovered by removing unreacted reactants and diluent, if any, by evaporation.

Alkyl peroxide reactants suitable for use in this invention have the formula ROOM wherein R is an alkyl group, which may be straight chain or branched, having one to eight carbon atoms, preferably four to eight, and M is hydrogen or an alkali metal. M is preferably hydrogen, lithium, potassium or sodium. Preferably the carbon atom in the alkyl group which is bonded to the oxygen atom is a tertiary carbon atom, as in t-butyl hydroperoxide.

Suitable phenylalkyl peroxide reactants have the formula

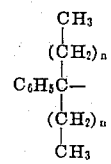

wherein $n$ is 0 to 2 and M is hydrogen or an alkali metal. M is preferably hydrogen, lithium, sodium or potassium. Especially suitable is alpha-cumyl hydroperoxide.

In the preferred embodiments of this invention, $R_f$ and $R_f'$ are independently perfluoroalkyl groups having the formula $-(CF_2)_nCF_3$ wherein $n$ is 0 to 5, preferably 0 or 1. In another preferred embodiment, $R_f$ is trifluoromethyl and $R_f'$ is trifluoromethyl or chlorodifluoromethyl, preferably trifluoromethyl.

The novel peroxides of this invention are useful to initiate polymerization of olefins, especially fluoroolefins, such as, in particular, fluoroperhalo-alpha-olefins having two to five carbon atoms, e.g., tetrafluoroethylene and chlorotrifluoroethylene. Except for the use of a peroxide of this invention as the initiator, the polymerization is carried out in accordance with conventional methods for polymerizing such olefins in the presence of a catalytic amount of a free radical initiator. Typically such methods comprise polymerizing the olefin in an aqueous medium at a temperature of from about 10° to 80° C and a pressure of from 15 to 500 psig. The aqueous medium is usually buffered to a pH between 7 and 11. The peroxides of this invention are employed in a catalytic amount sufficient to initiate polymerization. Preferably this amount corresponds to a concentration of from about 0.1% to 2.0 percent by weight in the aqueous medium.

The following examples further illustrate the invention. In each example the reaction was carried out under substantially anhydrous conditions and the product was identified by modern analytical techniques.

EXAMPLE 1

Hexafluoroacetone gas was slowly introduced at room temperature into a reactor containing t-butyl hydroperoxide. The hexafluoroacetone was continuously absorbed by the liquid reaction medium and additional hexafluoroacetone was continually added to maintain a constant pressure of about one atmosphere. When no further absorption occurred, the reaction mixture was subjected to a vacuum to remove unreacted hexafluoroacetone. The remaining liquid was identified as $(CH_3)_3COOC(CF_3)_2OH$.

EXAMPLE 2

Hexafluoroacetone was added to a slurry of $(CH_3)_3COONa$ in acetonitrile at 0° C until the $(CH_3)COONa$ dissolved to give a clear solution. The reaction mixture was then stirred at room temperature for 30 minutes. The product was recovered as a residue after the reaction mixture had been subjected to a vacuum at 35° C. By recrystallizing the product from methylene chloride, there was obtained a 75% yield of white crystals, melting point 86°–87° C, identified as $(CH_3)_3COOC(CF_3)_2ONa$.

We claim:

1. A peroxide having the formula

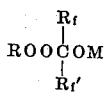

wherein R is selected from the group consisting of alkyl groups having one to eight carbon atoms and phenylalkyl groups having the formula

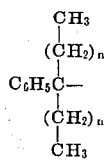

wherein each n is independently 0 to 2; $R_f$ and $R_f'$ are independently perfluoroalkyl groups having the formula $CF_2(CF_2)M$ wherein $n$ is 0 to 5; and M is hydrogen or an alkali metal.

2. The peroxide of claim 1 wherein R is an alkyl radical having one to eight carbon atoms.

3. The peroxide of claim 2 wherein $R_f$ and $R_f'$ are trifluoromethyl.

4. The peroxide of claim 3 wherein M is hydrogen, lithium, sodium or potassium.

5. The peroxide of claim 1 wherein R is a phenylalkyl radical having the formula

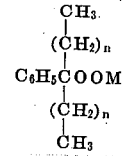

wherein each $n$ is independently 0 to 2.

6. The peroxide of claim 4 wherein $R_f$ and $R_f'$ are trifluoromethyl.

7. The peroxide of claim 6 wherein R is alphacumyl.

* * * * *

UNITED STATES PATENT AND TRADEMARK OFFICE
CERTIFICATE OF CORRECTION

PATENT NO. : 3,859,361
DATED : January 7, 1975
INVENTOR(S) : L.R. Anderson, W.B. Fox, C.V. Hardin, C.T. Ratcliffe It is certified that error appears in the above-identified patent and that said Letters Patent are hereby corrected as shown below:

Column 2, lines 1-5, the formula should read --

$$\begin{array}{c} CH_3 \\ | \\ (CH_2)_n \\ | \\ C_6H_5COOM \\ | \\ (CH_2)_n \\ | \\ CH_3 \end{array}$$

--.

Column 3, line 19, the formula should read -- $-CF_2(CF_2)_n$ --.

Column 4, lines 10-14, the formula should read --

$$\begin{array}{c} CH_3 \\ | \\ (CH_2)_n \\ | \\ -C_6H_5C- \\ | \\ (CH_2)_n \\ | \\ CH_3 \end{array}$$

--.

Signed and Sealed this twenty-first Day of October 1975

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,859,361
DATED : January 7, 1975
INVENTOR(S) : L.R. Anderson, W.B. Fox, C.V. Hardin, C.T. Ratcliffe It is certified that error appears in the above-identified patent and that said Letters Patent are hereby corrected as shown below:

Column 3, line 19, the formula should read -- $-(CF_2)_n CF_3$ --.

Column 4, line 17, "claim 4" should read -- claim 5 --.

Signed and Sealed this sixteenth Day of March 1976

[SEAL]

Attest:

RUTH C. MASON
Attesting Officer

C. MARSHALL DANN
Commissioner of Patents and Trademarks